US011245147B2

(12) United States Patent
Jang

(10) Patent No.: US 11,245,147 B2
(45) Date of Patent: Feb. 8, 2022

(54) POUCH-TYPE SECONDARY BATTERY HAVING UNSEALED PORTION

(71) Applicant: Samsung SDI Co., Ltd., Yongin-si (KR)

(72) Inventor: Pill Gyu Jang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/754,663

(22) PCT Filed: Sep. 27, 2018

(86) PCT No.: PCT/KR2018/011417
§ 371 (c)(1),
(2) Date: Apr. 8, 2020

(87) PCT Pub. No.: WO2019/098522
PCT Pub. Date: May 23, 2019

(65) Prior Publication Data
US 2020/0358044 A1 Nov. 12, 2020

(30) Foreign Application Priority Data
Nov. 14, 2017 (KR) .......................... 10-2017-0151651

(51) Int. Cl.
*H01M 50/116* (2021.01)
*H01M 50/342* (2021.01)
(Continued)

(52) U.S. Cl.
CPC ....... *H01M 50/116* (2021.01); *H01M 50/342* (2021.01); *H01M 50/394* (2021.01); *H01M 50/543* (2021.01); *H01M 50/578* (2021.01)

(58) Field of Classification Search
CPC ............. H01M 50/342; H01M 50/394; H01M 50/543; H01M 50/578
See application file for complete search history.

(56) References Cited

U.S. PATENT DOCUMENTS 7,875,383 B2 * 1/2011 Hwang ................. H01M 50/10
429/162
8,053,104 B2 * 11/2011 Kim .................... H01M 50/543
429/163
(Continued)

FOREIGN PATENT DOCUMENTS

JP          5374742 B2    12/2013
JP     2017-506412 A     3/2017
(Continued)

OTHER PUBLICATIONS

Korean Intellectual Property Office Notice of Allowance for corresponding Korean Patent Application No. 10-2017-0151651, dated Jul. 27, 2020, 2 pages.

*Primary Examiner* — Maria Laios
*Assistant Examiner* — Bartholomew A Hornsby
(74) *Attorney, Agent, or Firm* — Lewis Roca Rothgerber Christie LLP

(57) ABSTRACT

Various embodiments of the present invention relate to a pouch-type secondary battery having an unsealed portion. The technical purpose to be achieved is to provide a pouch-type secondary battery having an unsealed portion, wherein when gas is generated inside the battery due to overcharging, heat exposure, etc. and the pouch is swelled by the generated gas, the gas can be quickly discharged out of the battery through the unsealed portion, thereby improving safety. To this end, the present invention provides a pouch-type secondary battery comprising: an electrode assembly; and a pouch that comprises a first sheathing portion having a recess in which the electrode assembly is received, a second sheathing portion covering the recess of the first sheathing portion, and a seal portion formed along the peripheries of the first and the second sheathing portions, wherein the seal portion further has at least one unsealed portion connected (Continued)

to the recess, and the unsealed portion is lower than the recess.

14 Claims, 10 Drawing Sheets

(51) Int. Cl.
*H01M 50/30* (2021.01)
*H01M 50/543* (2021.01)
*H01M 50/578* (2021.01)

(56) References Cited

U.S. PATENT DOCUMENTS

| | | | |
|---|---|---|---|
| 8,277,970 | B2 | 10/2012 | Yang et al. |
| 9,166,217 | B2 * | 10/2015 | Ha .................... H01M 50/572 |
| 10,014,497 | B2 | 7/2018 | Lee et al. |
| 2010/0028772 | A1 | 2/2010 | Yang et al. |
| 2012/0040235 | A1 * | 2/2012 | Cho .................... H01M 50/538 |
| | | | 429/156 |
| 2014/0030564 | A1 | 1/2014 | Lee |
| 2014/0199581 | A1 * | 7/2014 | Ryu .................... H01M 50/116 |
| | | | 429/161 |
| 2017/0170437 | A1 | 6/2017 | Lee et al. |

FOREIGN PATENT DOCUMENTS

| | | |
|---|---|---|
| KR | 10-0876455 B1 | 12/2008 |
| KR | 10-2014-0015769 A | 2/2014 |
| KR | 10-2014-0103402 A | 8/2014 |
| KR | 10-2014-0113218 A | 9/2014 |
| KR | 10-2016-0020759 A | 2/2016 |
| KR | 20160020759 A * | 2/2016 |
| KR | 10-2016-0088647 A | 7/2016 |
| KR | 10-2016-0111614 A | 9/2016 |
| KR | 10-1653305 B1 | 9/2016 |

* cited by examiner

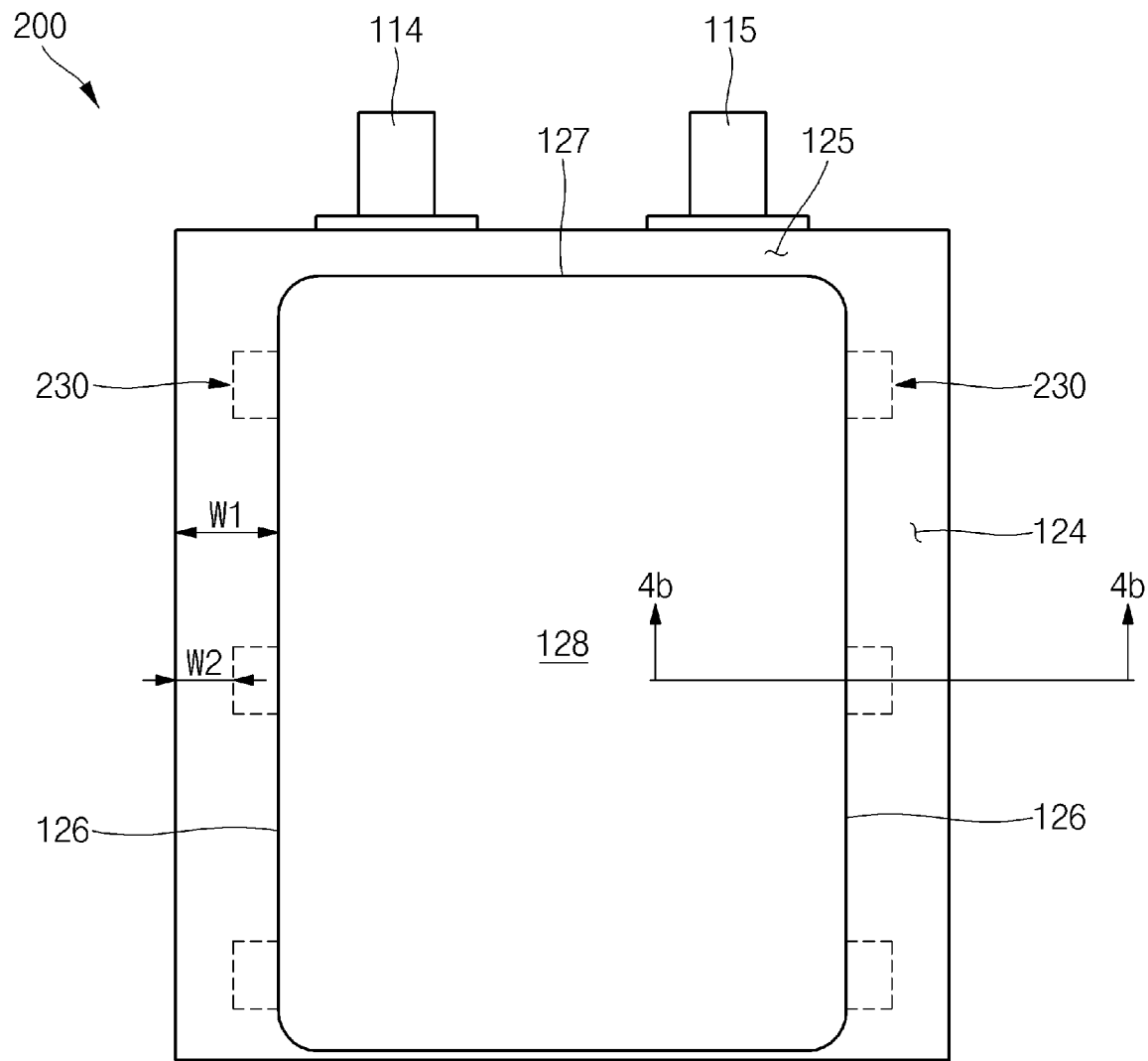

POUCH-TYPE SECONDARY BATTERY HAVING UNSEALED PORTION

CROSS-REFERENCE TO RELATED APPLICATION(S)

This application is a National Phase Patent Application of International Patent Application Number PCT/KR2018/011417, filed on Sep. 27, 2018, which claims priority of Korean Patent Application No. 10-2017-0151651, filed Nov. 14, 2017. The entire contents of both of which are incorporated herein by reference.

TECHNICAL FIELD

Various embodiments of the present invention relate to a pouch-type secondary battery having an unsealed portion.

BACKGROUND ART

Unlike a primary battery that cannot be charged, a secondary battery can be charged and discharged. A low-capacity secondary battery is used as the power source for various portable small-sized electronic devices, such as smart phones, feature phones, notebook computers, camcorders, and so on. A high-capacity secondary battery is used as the power source for motor drives, such as those in hybrid vehicles, or electric vehicles, or a power storage cell.

The secondary battery generally includes an electrode assembly including a positive electrode and a secondary electrode, a case accommodating the electrode assembly, and electrode tabs connected to the electrode assembly. The case can be classified into a circular type, a prismatic type, and a pouch type according to its external shape. Specifically, the pouch type secondary battery can include a pouch that can be easily transformed into various shapes and has a small weight.

The above information disclosed in this Background section is only for enhancement of understanding of the background of the described technology and therefore it may contain information that does not form the prior art that is already known in this country to a person of ordinary skill in the art.

DESCRIPTION OF EMBODIMENTS

Technical Problem

Provided is a pouch-type secondary battery having an unsealed portion, wherein when gas is generated inside the battery due to overcharging, heat exposure, etc. and the pouch is swelled by the generated gas, the gas can be quickly discharged out of the battery through the unsealed portion, thereby improving safety.

Solution to Problem

Provided is a pouch-type secondary battery according to various embodiments of the present invention, including: an electrode assembly; and a pouch that comprises a first sheathing portion having a recess in which the electrode assembly is received, a second sheathing portion covering the recess of the first sheathing portion, and a seal portion formed along the peripheries of the first and the second sheathing portions, wherein the seal portion further has at least one unsealed portion connected to the recess, and the unsealed portion is lower than the recess.

The unsealed portion may be provided by allowing the first sheathing portion and the second sheathing portion of the pouch to be spaced apart from each other.

The unsealed portion may be provided by allowing the first sheathing portion and the second sheathing portion of the pouch not to be adhered to each other.

The unsealed portion may be located at the first sheathing portion or the second sheathing portion of the pouch.

The unsealed portion may be located at both of the first sheathing portion and the second sheathing portion of the pouch.

The unsealed portion may have a curved or angled cross-section.

The seal portion of the pouch may include a primary folded portion that is primarily folded in a direction parallel to a length direction of the electrode assembly, and a secondly folded portion that is secondly folded toward the electrode assembly in a direction parallel to the primary folded portion, and the unsealed portion may range from the recess to the secondly folded portion.

The seal portion of the pouch may include a pair of lengthwise seal portions that are parallel to the length direction of the electrode assembly, and a widthwise seal portion that is parallel to a width direction of the electrode assembly, and the unsealed portion may be located at the lengthwise seal portions.

The seal portion of the pouch may include a pair of lengthwise seal portions that are parallel to the length direction of the electrode assembly, and a widthwise seal portion that is parallel to the width direction of the electrode assembly, and the unsealed portion may be located at the widthwise seal portion.

The seal portion of the pouch may include a pair of lengthwise seal portions that are parallel to the lengthwise direction of the electrode assembly, and a widthwise seal portion that is parallel to the widthwise direction of the electrode assembly, and the unsealed portion may be located at both of the lengthwise seal portions and the widthwise seal portion.

Advantageous Effects of Disclosure

As described above, various embodiments of the present invention provides a pouch-type secondary battery having an unsealed portion, wherein when gas is generated inside the battery due to overcharging, heat exposure, etc. and the pouch is swelled by the generated gas, the gas can be quickly discharged out of the battery through the unsealed portion, thereby improving safety. That is to say, in the present invention, the seal portion of the pouch further has the unsealed portion, which can quickly discharge the internal gas of the battery by opening the relatively long or short seal portion corresponding to the unsealed portion when the internal pressure of a sheath material of the pouch exceeds a reference pressure.

BRIEF DESCRIPTION OF DRAWINGS

FIGS. 4A and 4B are a plan view and a partially cross-sectional view of a pouch-type secondary battery having an unsealed portion according to various embodiments of the present invention.

MODE OF DISCLOSURE

Figure 1A:
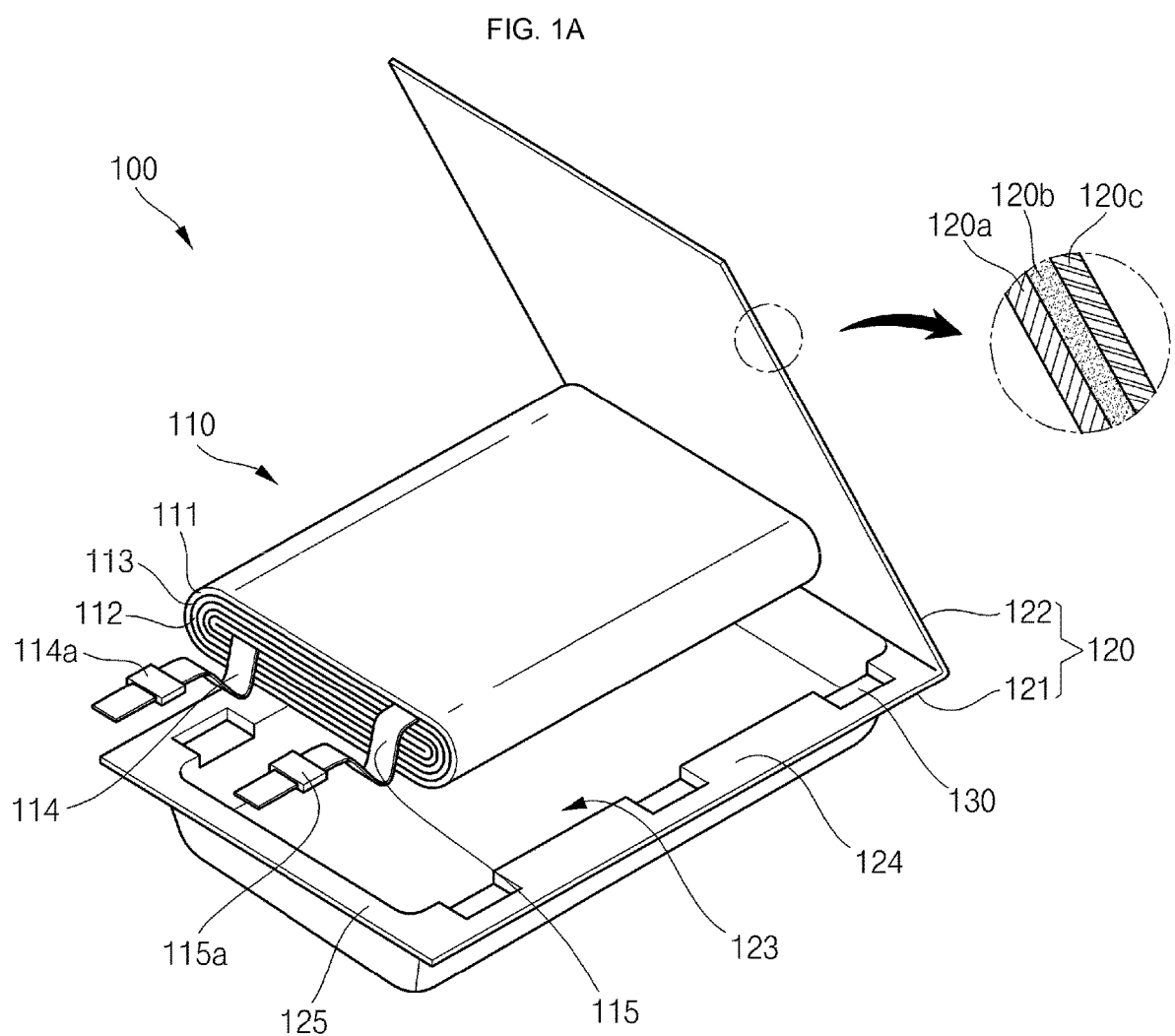
FIGS. 1A and 1B are an exploded perspective view and a coupling plan view of a pouch-type secondary battery having an unsealed portion according to various embodiments of the present invention.

Hereinafter, a preferred embodiment of the present invention will be described in detail.

Various embodiments of the present invention may be embodied in many different forms and should not be construed as being limited to the example embodiments set forth herein. Rather, these example embodiments of the invention are provided so that this disclosure will be thorough and complete and will convey inventive concepts of the disclosure to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present invention.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Figure 1B:
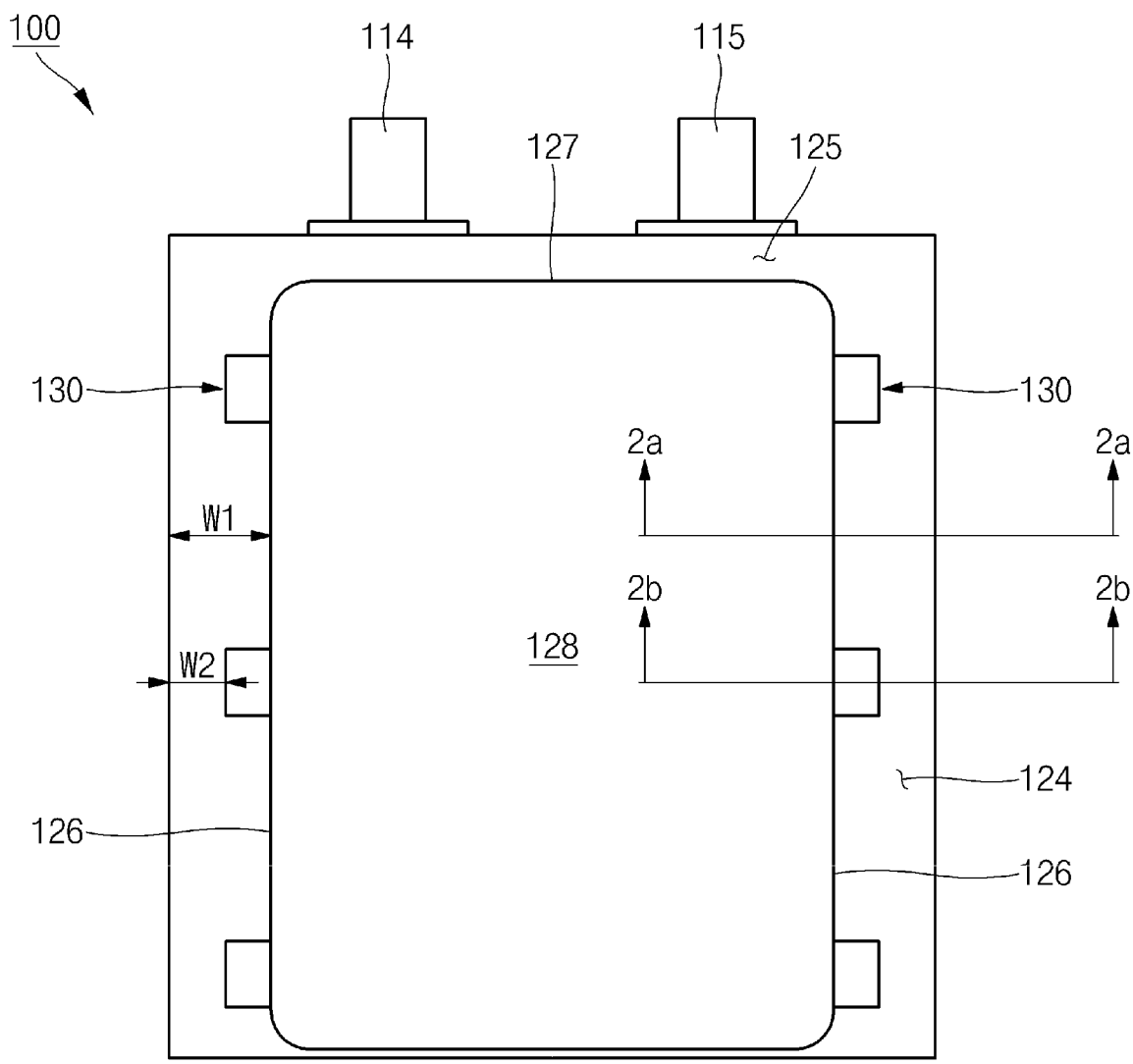

Referring to FIGS. 1A and 1B, an exploded perspective view and a coupling plan view of a pouch-type secondary battery 100 having an unsealed portion according to various embodiments of the present invention are illustrated.

As illustrated in FIGS. 1A and 1B, the secondary battery 100 according to various embodiments of the present invention includes an electrode assembly 110, a pouch 120 and an unsealed portion 130.

The electrode assembly 110 may include a first electrode 111, a second electrode 112 and a separator 113 positioned between the first electrode 111 and the second electrode 112. The electrode assembly 110 may be provided by winding a stacked structure having the first electrode 111, the separator 113 and the second electrode 112. Although the electrode assembly 110 of a winding type or a jelly-roll type is illustrated by way of example in the drawing, an electrode assembly of a stack type may be used by way of another example in the present invention.

The first electrode 111 may operate as a positive electrode and the second electrode 112 may operate as a negative electrode, or vice versa, of course. However, the following description will be made on the assumption that the first electrode 111 is a positive electrode and the second electrode 112 is a negative electrode.

The first electrode 111 includes a first electrode active material layer coated on both surfaces of a first electrode current collector made of, but not limited to, a highly conductive metal thin plate, for example, an aluminum foil or mesh. Here, a chalcogenide compound may be used as the first electrode active material, and examples thereof may include composite metal oxides, such as $LiCoO_2$, $LiMn_2O_4$, $LiNiO_2$, $LiNiMnO_2$. A first electrode tab 114 may be boated at, but not limited to, a first electrode uncoated portion of the first electrode current collector where the first electrode active material layer is not located. That is to say, one end of the first electrode tab 114 may be electrically connected to the first electrode uncoated portion and the other end thereof protrudes to the outside. In addition, an insulation member 114a may be attached to the first electrode tab 114 to prevent the first electrode tab 114 from being short-circuited to the pouch 120.

The second electrode 112 includes a second electrode active material layer coated on both surfaces of a second electrode current collector made of, but not limited to, a conductive metal thin plate, for example, a copper (Cu) or nickel (Ni) foil. A carbon-based material, Si, Sn, tin oxide, tin alloy composite, transition metal oxide, lithium metal nitride, or metal oxide may be used as the second electrode active material. Here, a second electrode tab 115 may be formed at, but not limited to, a second electrode uncoated portion of the second electrode current collector where the second electrode active material layer is not located. That is to say, one end of the second electrode tab 115 may be electrically connected to the second electrode uncoated portion and the other end thereof protrudes to the outside. In addition, an insulation member 115a may be attached to the second electrode tab 115 to prevent the second electrode tab 115 from being short-circuited to the pouch 120.

The separator 113 may be positioned between the first electrode 111 and the second electrode 112 and prevents a short circuit between the first electrode 111 and the second electrode 112. The separator 113 may be made of one selected from the group consisting of, but not limited to, polyethylene, polypropylene, and a porous copolymer of polyethylene and polypropylene. In order to prevent the short circuit between the first electrode 111 and the second electrode 112, the separator 113 may be formed to have a width greater than that of the first electrode 111 or the second electrode 112. In addition, the term "separator" is a concept, which encompasses, but not limited to, a solid electrolyte (e.g., an inorganic ceramic based electrolyte, such as perovskite-, NASICON-, LISICON-, sulfide-, garnet- or glass-based electrolyte, or a polymer-based electrolyte), and in this case, a liquid electrolyte may be omitted.

The pouch, pouch sheath material or laminate sheath material 120 accommodates the electrode assembly 110 and is formed by sealing the outer periphery of the electrode assembly 110. The pouch 120 may include a first sheathing portion 121 having a recess 123 having a predetermined depth to accommodate the electrode assembly 110, and a second sheathing portion 122 having one end connected to the first sheathing portion 121 and covering the electrode assembly 110.

In addition, the pouch 120 may include a pair of lengthwise seal portions 124 and one widthwise seal portion 125, which are provided such that edges of the first and second sheathing portions 121 and 122, corresponding to the outer circumferential edges of the electrode assembly 110, are thermally fused to each other. That is to say, the pair of lengthwise seal portions 124 are provided such that the edges of the first and second sheathing portions 121 and 122 are sealed to each other in a direction substantially parallel to a length direction of the electrode assembly 110, and the one widthwise seal portion 125 is provided such that the edges of the first and second sheathing portions 121 and 122 are sealed to each other in a direction substantially parallel to a width direction of the electrode assembly 110. Here, the lengthwise seal portions 124 and the widthwise seal portion 125 are substantially perpendicular to each other. That is to say, the pair of lengthwise seal portions 124 and the one widthwise seal portion 125 are substantially in an inverted U-shaped ("∩") configuration.

The electrode assembly 110 is safely protected within the pouch 120 and leakage of an electrolyte is prevented by the lengthwise seal portions 124 and the widthwise seal portion 125 of the pouch 120.

In addition, the first sheathing portion 121 includes four extending regions 126 and 127 extending away from the second sheathing portion 122 and a planar region 128 connected to the four extending regions 126 and 127 and serving as a bottom of the recess 123. Here, among the four extending regions 126 and 127, relatively long regions may be defined as long-side extending regions 126, and relatively short regions may be defined as short-side extending regions 127. Additionally, the lengthwise seal portions 124 are located adjacent to the long-side extending regions 126, and the widthwise seal portion 125 is located adjacent to the short-side extending regions 127.

The first and second electrode tabs 114 and 115 of the electrode assembly 110 are outwardly drawn through the widthwise seal portion 125 where the first sheathing portion 121 and the second sheathing portion 122 are sealed. Here, the insulation members 114a and 115a located at the first and second electrode tabs 114 and 115 are sealed together with the widthwise seal portion 125. That is to say, the insulation members 114a and 115a are located at contact portions between the first and second electrode tabs 114 and 115 and the widthwise seal portion 125, thereby prevent the first and second electrode tabs 114 and 115 from being short-circuited to the pouch 120.

The pouch 120 may have a multilayered structure including, but not limited to, a first insulation layer 120a, a metal layer 120b and a second insulation layer 120c. Additionally, various adhesion layers or functional layers may further be provided, but detailed descriptions thereof will not be given so as not to obscure the essence of the present invention.

The first insulation layer 120a defining an inner surface of the pouch case 120 may be made of a material having an insulating property and thermal adhesiveness. In addition, the first insulation layer 120a is located at one surface of the metal layer 120b and defines the inner surface of the pouch case 120 facing the electrode assembly 110. The first insulation layer 120a may be made of, but not limited to, casted polypropylene (CPP) that does not react with an electrolyte, and an equivalent thereof. The electrode assembly 110 is received in the recess 123 of the first sheathing portion 121 and the recess 123 is covered by the second sheathing portion 122, so that the first insulation layers 120a of the first and second sheathing portion 121 and 122 of the pouch 120 are brought into contact with each other. Therefore, the seal portions 124 and 125 are thermally fused to allow the first insulation layers 120a to be adhered to each other, thereby sealing the pouch 120.

The metal layer 120b, which is positioned between the first insulation layer 120a and the second insulation layer 120c, prevents external moisture and oxygen from being induced into the pouch 120 and, if an electrolyte is contained in the pouch 120, prevents the electrolyte from being leaked out. In addition, the metal layer 120b serves to maintain mechanical strength of the pouch 120. The metal layer 120b may be generally made of aluminum, an aluminum alloy, iron, or an iron alloy. The metal layer 120b may be subjected to a drawing process during formation of the recess 123 and may have a reduced thickness specifically at its region that is heavily drawn, to be cracked, lowering a moisture-preventing property (that is, increasing a moisture-absorbing property). Therefore, it is quite important to control the thickness of the metal layer 120b drawn during the formation of the recess 123.

The second insulation layer 120c may define an exterior surface of the pouch 120 and reduces mechanical, chemical impacts with respect to external electronic device. In addition, the second pouch layer 120c may be located at the other surface of the metal layer 120b, defining the exterior surface of the pouch 120. The second insulation layer 120c may be made of, but not limited to, nylon, polyethylene terephthalate (PET), polybutylene terephthalate (PBT), polybutylene naphthalate (PBN) or equivalents thereof.

Continuously, referring to FIGS. 1A and 1B, the secondary battery 100 according to various embodiments of the present invention further includes an unsealed portion 130 located on the pouch 120. The unsealed portion 130 may be located on the lengthwise seal portions 124 substantially parallel to, for example, the length direction of the electrode assembly 110. That is to say, a cavity having a predetermined depth (height) may be further provided in the lengthwise seal portions 124 of the first sheathing portion 121 located adjacent to the electrode assembly 110, and thus the unsealed portion 130 can be implemented. Specifically, the unsealed portion 130 may include a plurality of unsealed portions arranged with a constant pitch along the lengthwise seal portions 124.

Practically, the unsealed portion 130 may be implemented by further providing cavities having a predetermined depth along the periphery of the recess 123 by changing the design of a mold during the formation of the recess 123 having a predetermined depth in the first sheathing portion 121, while controlling such cavities so as not to sealed during a sealing process. Accordingly, the unsealed portion 130 may be connected to the recess 123 to thus share the gas produced in the recess 123.

Therefore, a width W2 of the lengthwise seal portion 124 having the unsealed portion 130 is smaller than a width W1 of each of the lengthwise seal portions 124. Therefore, if the internal pressure of the pouch 120 exceeds a reference pressure, the seal portion 124 having the unsealed portion 130.

Although each three unsealed portions 130 located at opposite sides of the electrode assembly 110, that is, a total of six unsealed portions 130, are shown in the figures, the present invention is not limited thereto. The number of the unsealed portions 130 may be increased or decreased according to the gas discharge pressure intended to be set.

As described above, in the secondary battery 100 according to embodiments of the present disclosure, when gas is generated inside the battery due to overcharging, heat exposure, etc. and the pouch is swelled by the generated gas, the unsealed portion 130 operates to quickly discharge the gas out of the battery, thereby improving the safety thereof. Since the width W2 of the lengthwise seal portion 124 located at a region substantially corresponding to the unsealed portion 130 is relatively small, the sealing structure of the region is ruptured/opened and the gas present inside the battery is discharged out of the battery.

In addition, since the unsealed portion 130 substantially has a predetermined space/cavity, extra electrolyte may further fill the space/cavity of the unsealed portion 130, thereby allowing the pouch 120 to receive a sufficient amount of electrolyte.

In addition, as described above, the predetermined space/cavity secured in the unsealed portion 130 allows the secondary battery 100 to be safety protected from external shocks. That is to say, a plurality unsealed portions 130 may function to safely protect the secondary battery 100 from external shocks, just like an airbag for an automotive vehicle.

Figure 2A:
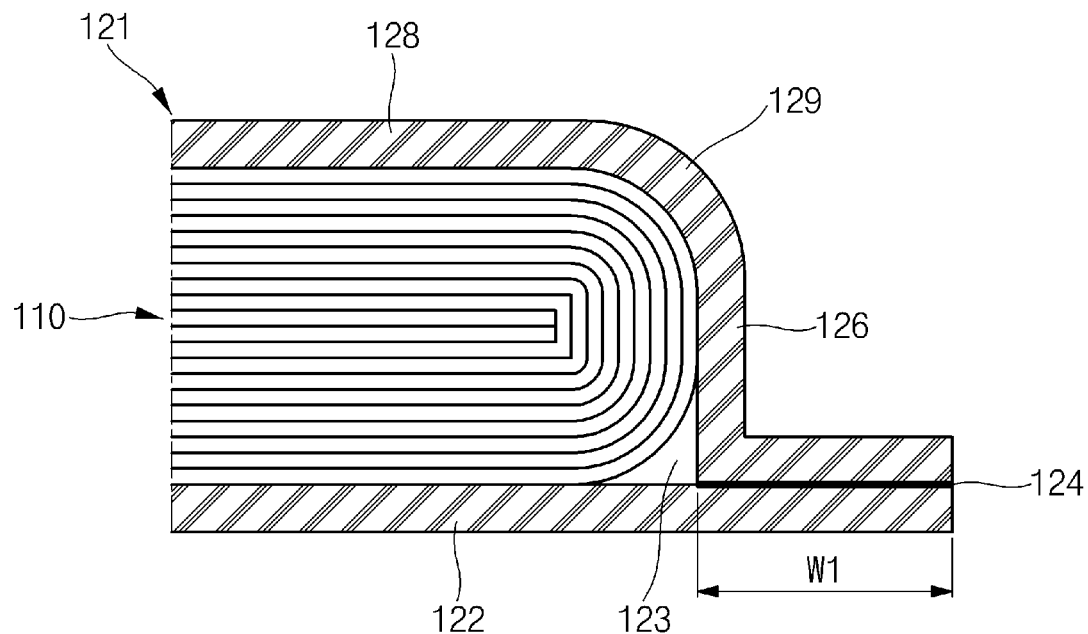
FIGS. 2A and 2B are partially cross-sectional views showing lines 2a-2a and 2b-2b of FIG. 1B.
Figure 2B:
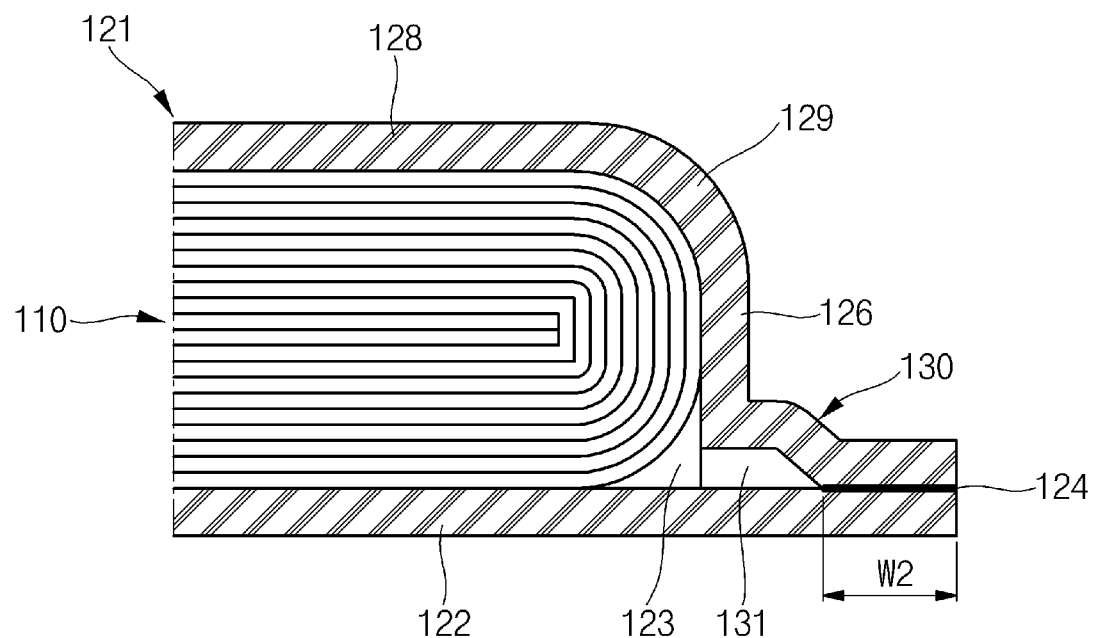

Referring to FIGS. 2A and 2B, partially cross-sectional views showing lines 2a-2a and 2b-2b of FIG. 1B are illustrated.

As illustrated in FIG. 2A, the lengthwise seal portions 124 may be provided by thermally fusing regions of the first sheathing portion 121 and the second sheathing portion 122 to each other at the exterior of the electrode assembly 110 and the exterior of the recess 123 of the first sheathing portion 121.

In addition, as illustrated in FIG. 2B, the unsealed portion 130 is located with a predetermined space 131 at the exterior of the electrode assembly 110 and/or the exterior of the recess 123 in the first sheathing portion 121. Specifically, the unsealed portion 130 is provided such that the first sheathing portion 121 and the second sheathing portion 122 are vertically spaced apart from each other without being thermally fused to each other. Accordingly, the unsealed portion 130 may have, for example, but not limited to, a substantially angled cross-section. The unsealed portion 130 illustrated in FIG. 2B has a cross-section angled twice.

As described above, as the lengthwise seal portion 124 located at the region having the unsealed portion 130 has the width W2 smaller than the width W1 of the lengthwise seal portions 124 located at the region without the unsealed portion 130, the gas may be generated in the pouch 120, and the pouch 120 may be excessively welled. In such a case, the lengthwise seal portion 124 located at the region having the unsealed portion 130 is ruptured/opened, so that the internal gas of the pouch 120 is rapidly discharged to the exterior. In the figures, undefined reference numeral 129 denotes a curved portion of the first sheathing portion 121, which is located between the extending regions 126 and 127 and the planar region 128.

Here, when the secondary battery 100 is cross-sectionally viewed, the height (or depth) of the unsealed portion 130 is preferably smaller than the height (or depth) of the recess 123. That is to say, when the height of the unsealed portion 130 is smaller than that of the recess 123, the gas generated due to overcharging or heat exposure of the secondary battery 100 may rapidly fill the unsealed portion 130, and thus the gas can be rapidly discharged out of the battery through the unsealed portion 130. If the height of the unsealed portion 130 is equal to that of the recess 123, the discharge speed (or time) of the internal gas is relatively low, undesirably lowering the safety of the secondary battery 100. Moreover, the unsealed portion 130 needs to be lower than the recess 123 to reduce the possibility of being cracked against a metal layer (made of, for example, aluminum) that is an inner layer of pouch during pouch formation. That is to say, if the unsealed portion 130 has the same height as the recess 123, the metal layer as the inner layer of the pouch is liable to crack during pouch formation, resulting in an increase in the rate of defective pouches. These features are commonly applied to all embodiments of the present invention.

Figure 3A:
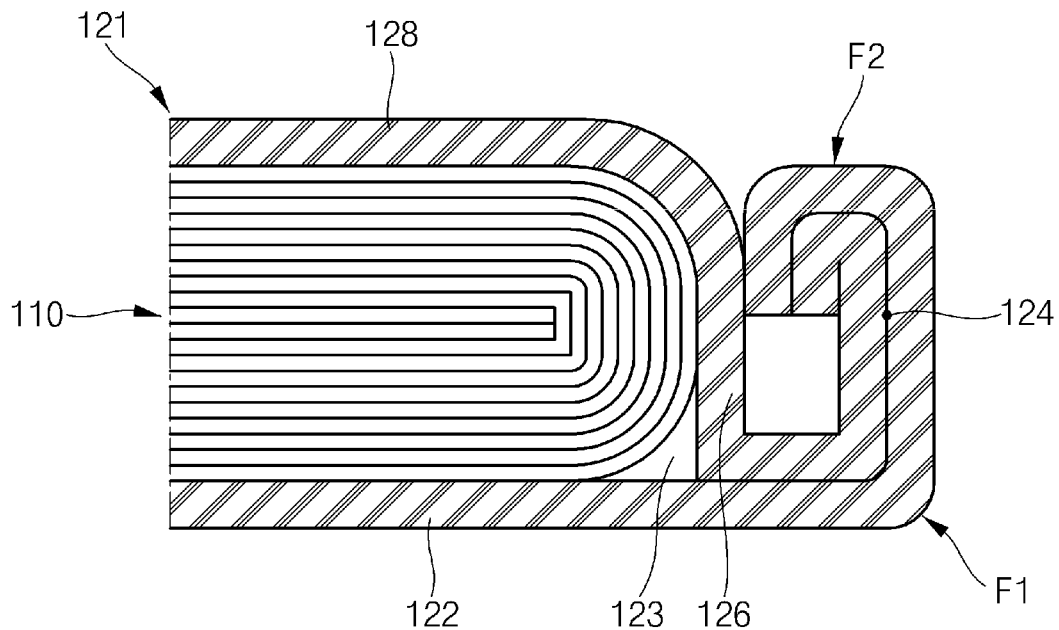
FIGS. 3A and 3B are partially cross-sectional views showing the seal portion and a folded state of the seal portion having the unsealed portion in the pouch-type secondary battery having the unsealed portion according to various embodiments of the present invention.
Figure 3B:
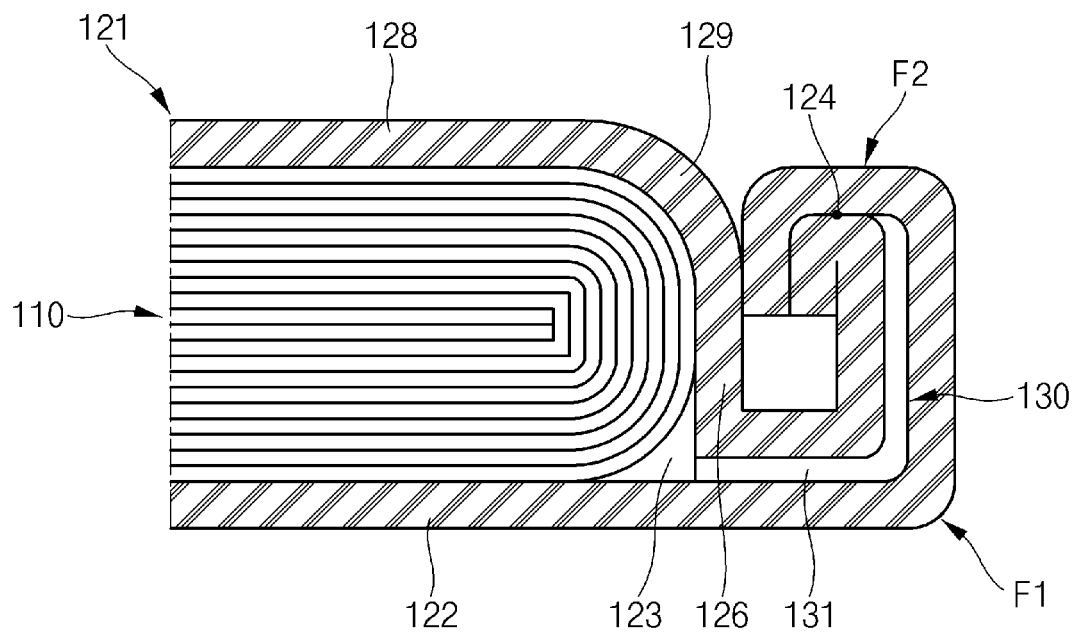

Referring to FIGS. 3A and 3B, partially cross-sectional views showing the seal portion 124 and a folded state of the seal portion 124 having the unsealed portion 130 in the pouch-type secondary battery 100 having the unsealed portion 130 according to various embodiments of the present invention are illustrated.

As illustrated in FIGS. 3A and 3B, in the pouch 120, a primary folded portion F1 and a secondly folded portion F2 may be located at the lengthwise seal portions 124 and the unsealed portion 130, respectively.

First, as illustrated in FIG. 3A, the lengthwise seal portion 124 without the unsealed portion 130 located thereat may include the primary folded portion F1 that is upwardly folded, and the secondly folded portion F2 that is further folded downwardly (that is, toward the electrode assembly 110 or the recess 123).

Next, as illustrated in FIG. 3B, the lengthwise seal portions 124 with the unsealed portion 130 located thereat may also include the primary folded portion F1 that is upwardly folded, and the secondly folded portion F2 that is further folded downwardly, and there may further be a predetermined space 131 ranging from the recess 123 to the secondly folded portion F2. That is to say, the space 131 corresponds to the unsealed portion 130.

In addition, an end of the secondly folded portion F2 faces downward, so that a metal layer that is a component of the pouch 120 may not be exposed to the exterior (upward), thereby preventing the metal layer from being short-circuited to an external device.

Figure 4B:
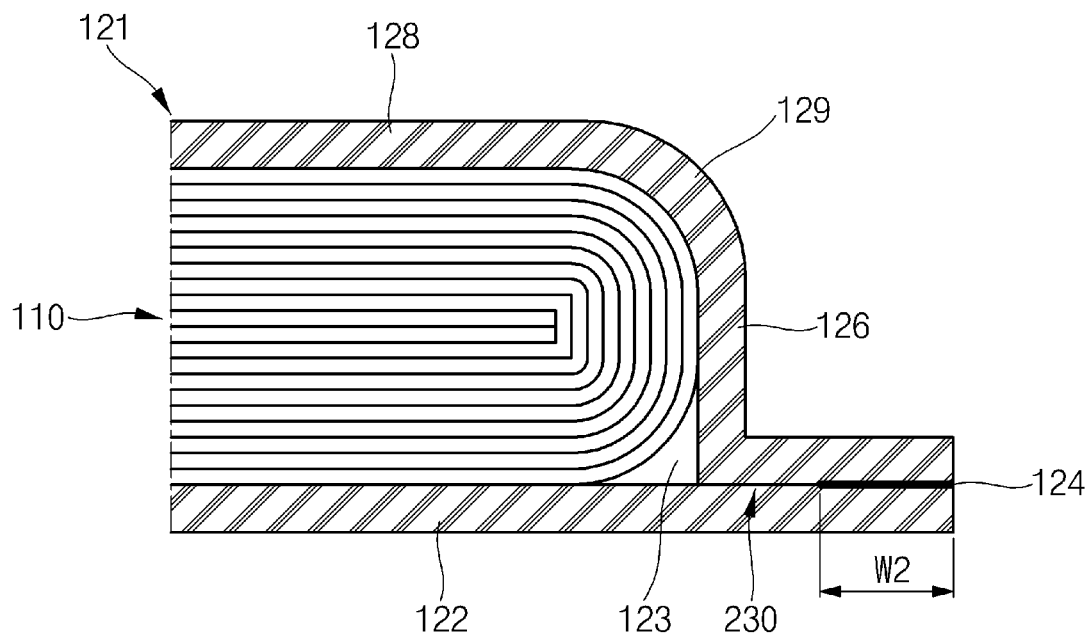

Referring to FIGS. 4A and 4B, a plan view and a partially cross-sectional view of a pouch-type secondary battery 200 having an unsealed portion 230 according to various embodiments of the present invention are illustrated.

As illustrated in FIGS. 4A and 4B, in the pouch-type secondary battery 200 according to various embodiments of the present invention, the unsealed portion 230 may be provided such that a predetermined space is given but sealing is not performed (not being adhesive). That is to say, a sealing process is generally performed by placing a first sheathing portion 121 and a second sheathing portion 122, which are superimposed one on another, between an upper hot-bar and a lower hot-bar, and then compressing each other. Here, recesses may be provided in the upper hot-bar and the lower hot-bar, which correspond to the unsealed portion 230, to prevent heat from being transferred to the first and second sheathing portions 121 and 122, thereby simply implementing the unsealed portion 230 without a region to be sealed. Of course, the first sheathing portion 121 and the second sheathing portion 122 may be brought into contact with each other in the unsealed portion 230, but the contact is not meant to refer to an adhesively contact state.

Therefore, if the internal pressure of the pouch 120 is greater than a preset pressure, the internal gas can be rapidly discharged out of the battery through the unsealed portion 230 without a sealed portion (that is, not being adhesive) and the lengthwise seal portion 124 located adjacent thereto.

Figure 5:
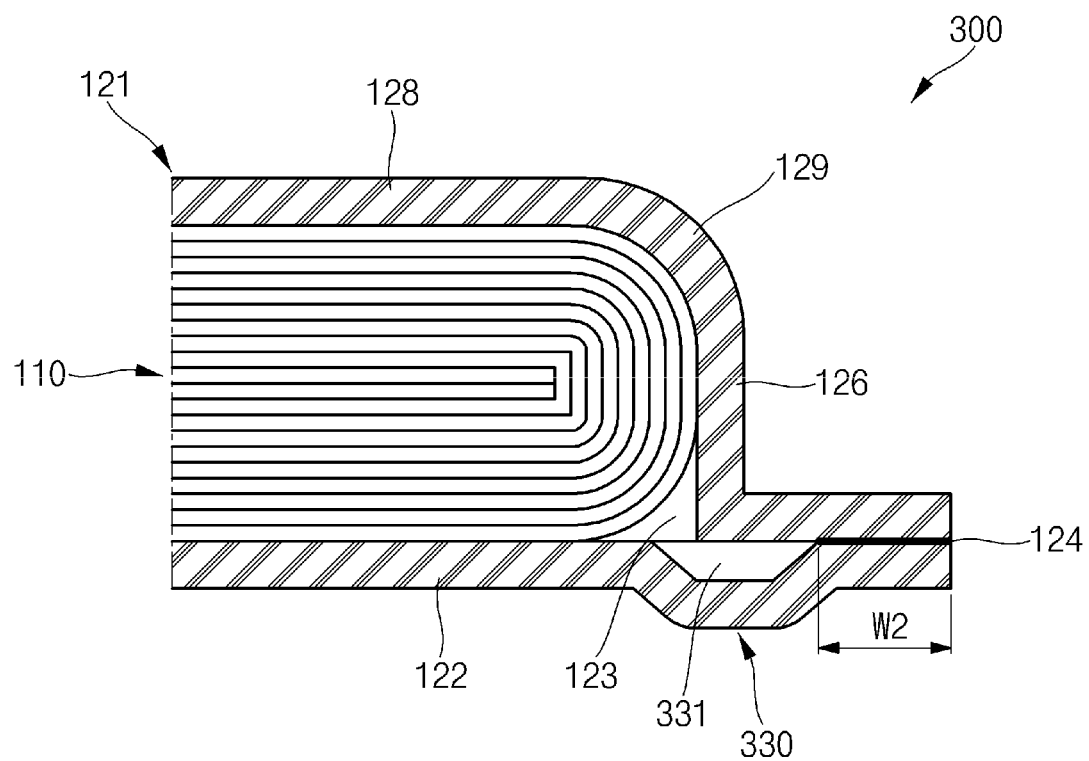
FIG. 5 is a partially cross-sectional view of a pouch-type secondary battery having an unsealed portion according to various embodiments of the present invention.

Referring to FIG. 5, a partially cross-sectional view of a pouch-type secondary battery 300 having an unsealed portion 330 according to various embodiments of the present invention is illustrated.

As illustrated in FIG. 5, in the secondary battery 300 according to various embodiments of the present invention, the unsealed portion 330 may be located at a second sheathing portion 122, rather than a first sheathing portion 121, at the exterior of an electrode assembly 110 and/or a recess 123.

That is to say, the first sheathing portion 121 may be maintained at a substantially planar state and may have an unsealed portion 330 having a substantially downwardly angled surface at the second sheathing portion 122, and a predetermined space 331 may be provided in the unsealed portion 330. Likewise, with this configuration, a lengthwise seal portion 124 adjacent to the unsealed portion 330 may have a relatively small width W2.

As described above, if the internal pressure of the pouch 120 is greater than a preset pressure, the internal gas can be rapidly discharged out of the battery through the unsealed portion 330 without a sealed portion and the lengthwise seal portion 124 located adjacent thereto.

Figure 6:
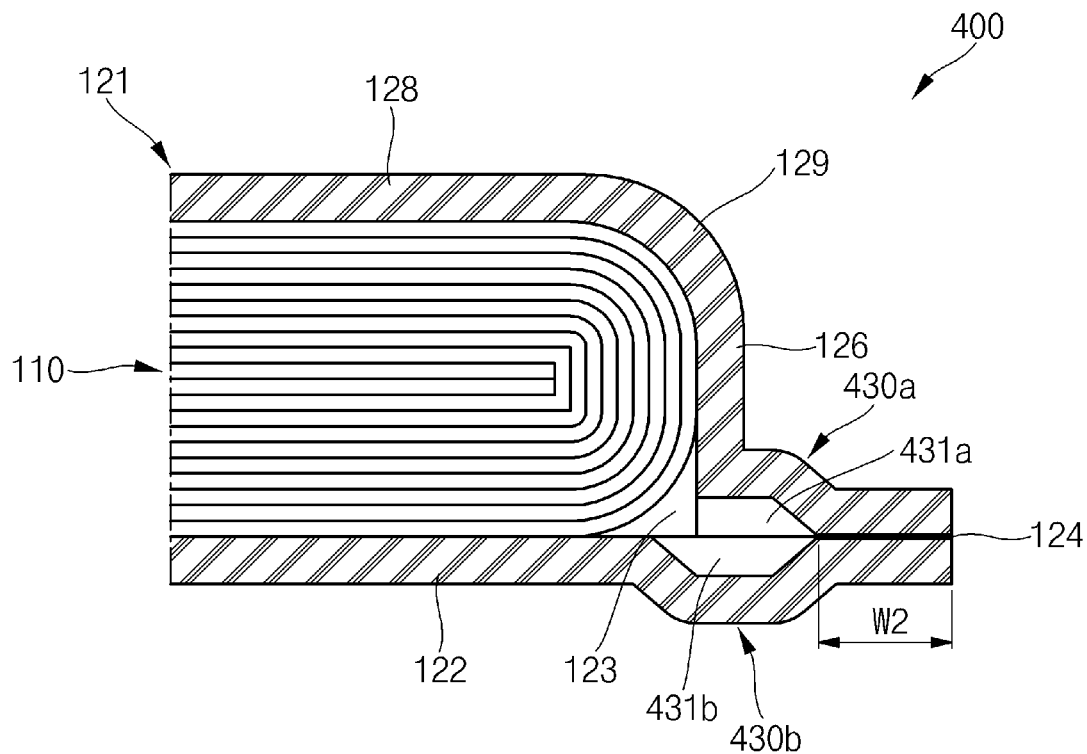
FIG. 6 is a partially cross-sectional view of a pouch-type secondary battery having unsealed portions according to various embodiments of the present invention.

Referring to FIG. 6, a partially cross-sectional view of a pouch-type secondary battery 400 having unsealed portions 430a and 430b according to various embodiments of the present invention are illustrated.

As illustrated in FIG. 6, in the secondary battery 400 according to various embodiments of the present invention, the unsealed portion 430a of one side may be located at a first sheathing portion 121 at the exterior of an electrode assembly 110 and/or a recess 123, and the unsealed portion 430b of the other side may be located at a second sheathing portion 122 at the exterior of the electrode assembly 110 and/or the recess 123.

Accordingly, a space 431a of the unsealed portion 430a located in the first sheathing portion 121 and a space 431b of the unsealed portion 430b located in the second sheathing portion 122 may be connected to each other. Of course, with this configuration, lengthwise seal portions 124 adjacent to the unsealed portions 430a and 430b may have a relatively small width W2.

As described above, if the internal pressure of the pouch 120 is greater than a preset pressure, the internal gas can be rapidly discharged out of the battery through the unsealed portions 430a and 430b without sealed portions and the lengthwise seal portions 124 located adjacent thereto. Also, in addition to the recess 123, the spaces 431a and 431b are further provided inside the pouch 120, thereby receiving a large amount of electrolyte in the pouch 120 and safely protecting the battery from external shocks.

Figure 7:
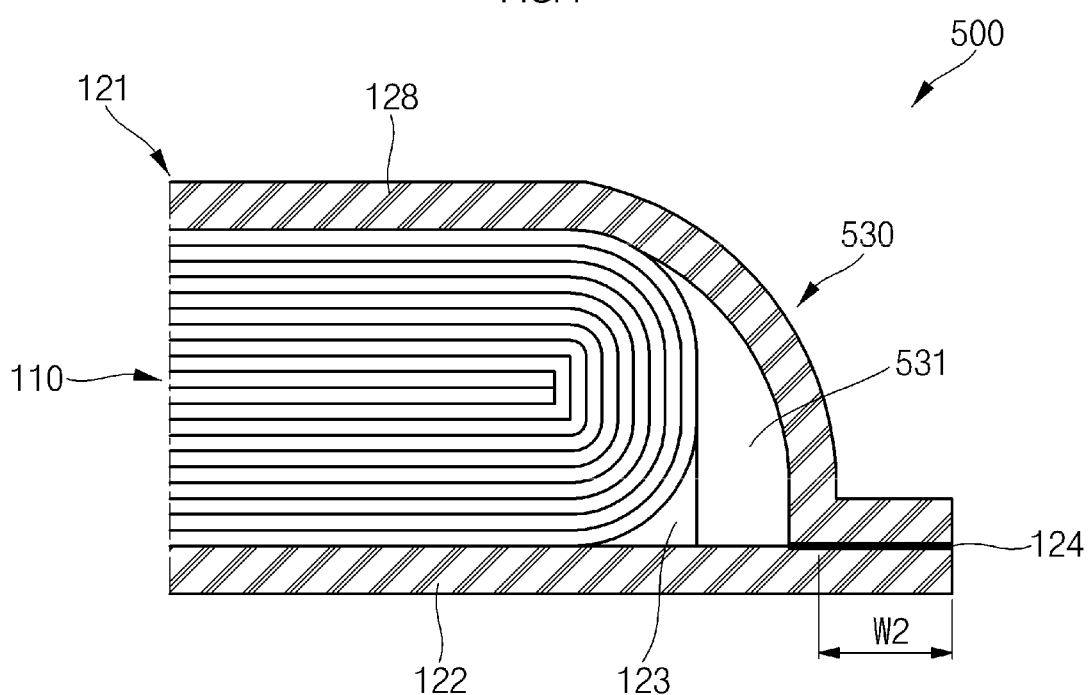
FIG. 7 is a partially cross-sectional view of a pouch-type secondary battery having an unsealed portion according to various embodiments of the present invention.

Referring to FIG. 7, a partially cross-sectional view of a pouch-type secondary battery 500 having an unsealed portion 530 according to various embodiments of the present invention is illustrated.

As illustrated in FIG. 7, in the secondary battery 500 according to various embodiments of the present invention, the unsealed portion 530 may be located at a first sheathing portion 121 at the exterior of an electrode assembly 110 and/or a recess 123 and may have a substantially curved cross-section. Specifically, the unsealed portion 530 may be shaped of a curved surface having a curvature. That is to say, the first sheathing portion 121 includes a curved portion between an extending region and a planar region, and the curved portion extends up to a lengthwise seal portion 124 with a curvature, thereby providing the unsealed portion 530 having a predetermined curvature. Of course, a relatively large space 531 may be provided adjacent to the recess 123 by the unsealed portion 530.

As described above, if the internal pressure of the pouch 120 is greater than a preset pressure, the internal gas can be rapidly discharged out of the battery through the unsealed portion 530 without a sealed portion and the lengthwise seal portion 124 located adjacent thereto.

Figure 8:
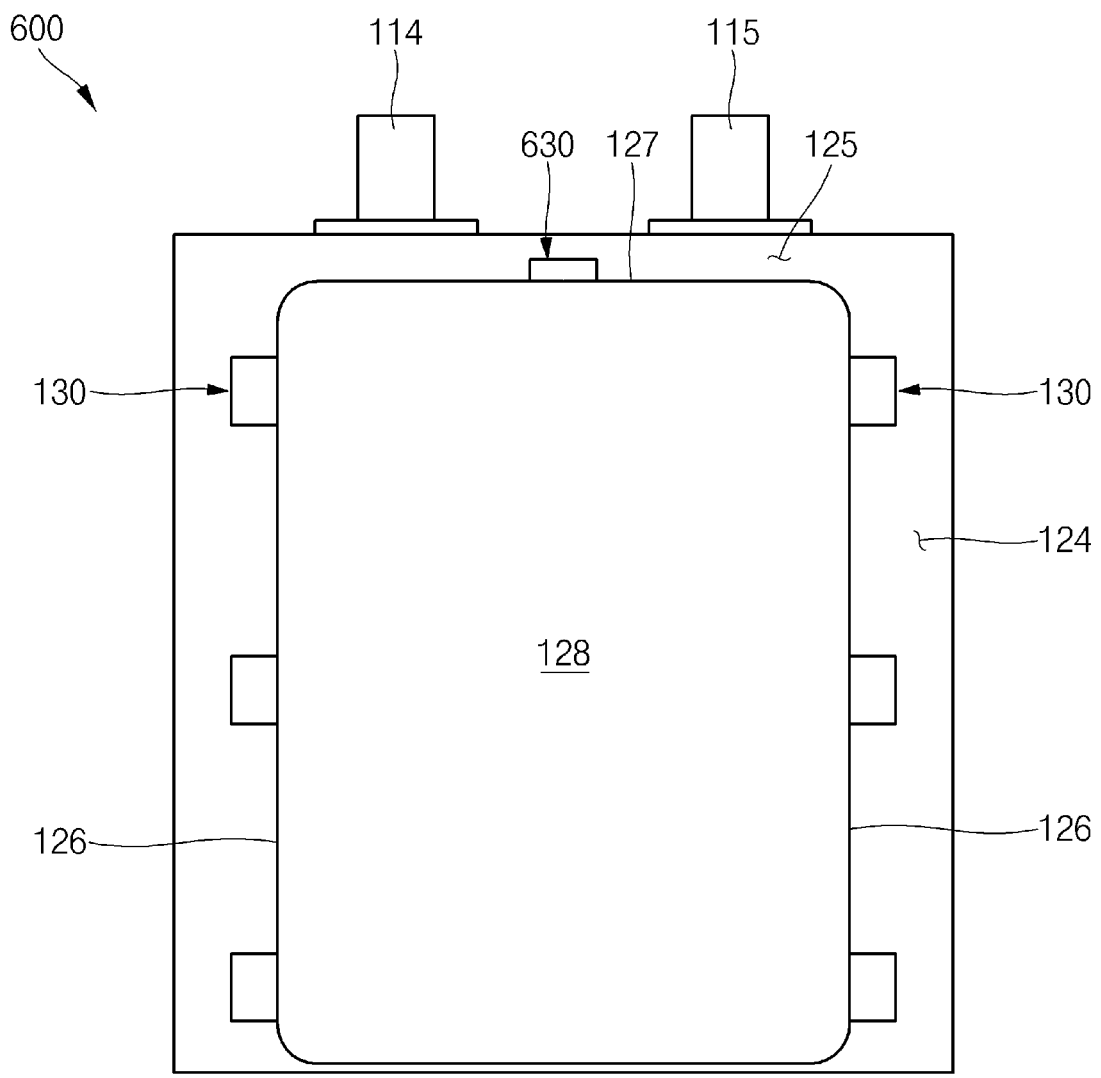
FIG. 8 is a plan view of a pouch-type secondary battery having unsealed portions according to various embodiments of the present invention.

Referring to FIG. 8, a plan view of a pouch-type secondary battery 600 having unsealed portions 130 and 630 according to various embodiments of the present invention is illustrated.

As illustrated in FIG. 8, in the pouch-type secondary battery 600 according to various embodiments of the present invention, the unsealed portion 630 may be located at a first sheathing portion 121 at the exterior of an electrode assembly 110 and/or a recess 123 and may have a predetermined space located at a widthwise seal portion 125. That is to say, the unsealed portion 630 may be located at the widthwise seal portion 125, which is generally referred to as a terrace portion through which first and second electrode tabs 114 and 115 penetrate and extend.

Here, since the widthwise seal portion 125 may have a smaller width than that of the lengthwise seal portion 124, the width of the seal portion 125 corresponding to the unsealed portion 630 located at the widthwise seal portion 125 may also be smaller than that of the seal portion 124 corresponding to the unsealed portion 130 located at the lengthwise seal portions 124.

Therefore, the unsealed portion 630 may operate at a relatively small internal pressure of the pouch 120.

Figure 9:
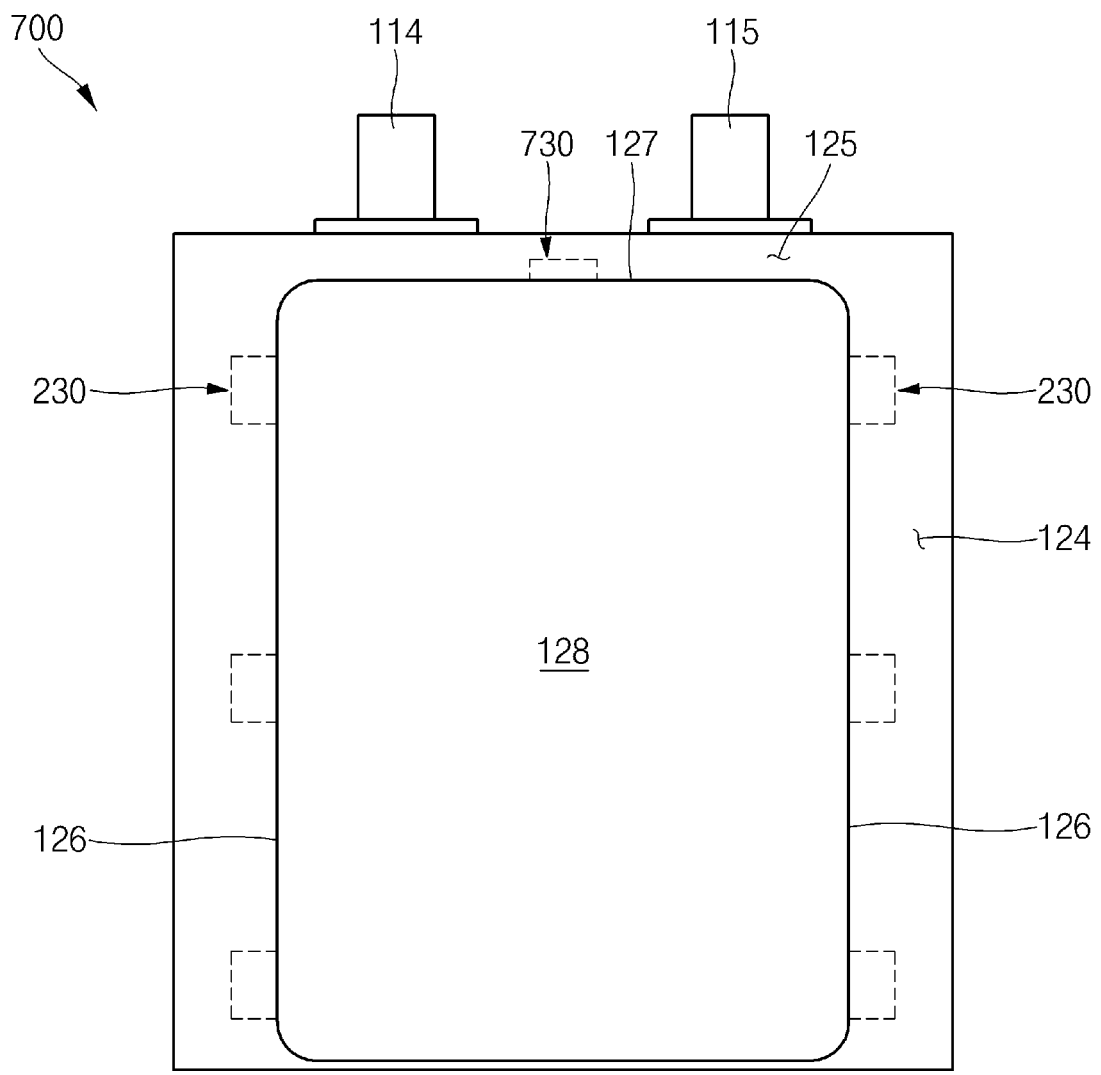
FIG. 9 is a plan view of a pouch-type secondary battery having unsealed portions according to various embodiments of the present invention.

Referring to FIG. 9, a plan view of a pouch-type secondary battery 700 having unsealed portions 230 and 730 according to various embodiments of the present invention is illustrated.

As illustrated in FIG. 9, in the pouch-type secondary battery according to various embodiments of the present invention, the unsealed portion 730 may be located at a widthwise seal portion 125 without sealed portions at the exterior of an electrode assembly 110 and/or a recess. That is to say, predetermined regions of the widthwise seal portion 125 through which first and second electrode tabs 114 and 115 penetrate and extend may not be sealed, thereby naturally providing the unsealed portion 730. Similarly to described above, the unsealed portion 730 may operate at a relatively small internal pressure of the pouch 120.

Figure 10:
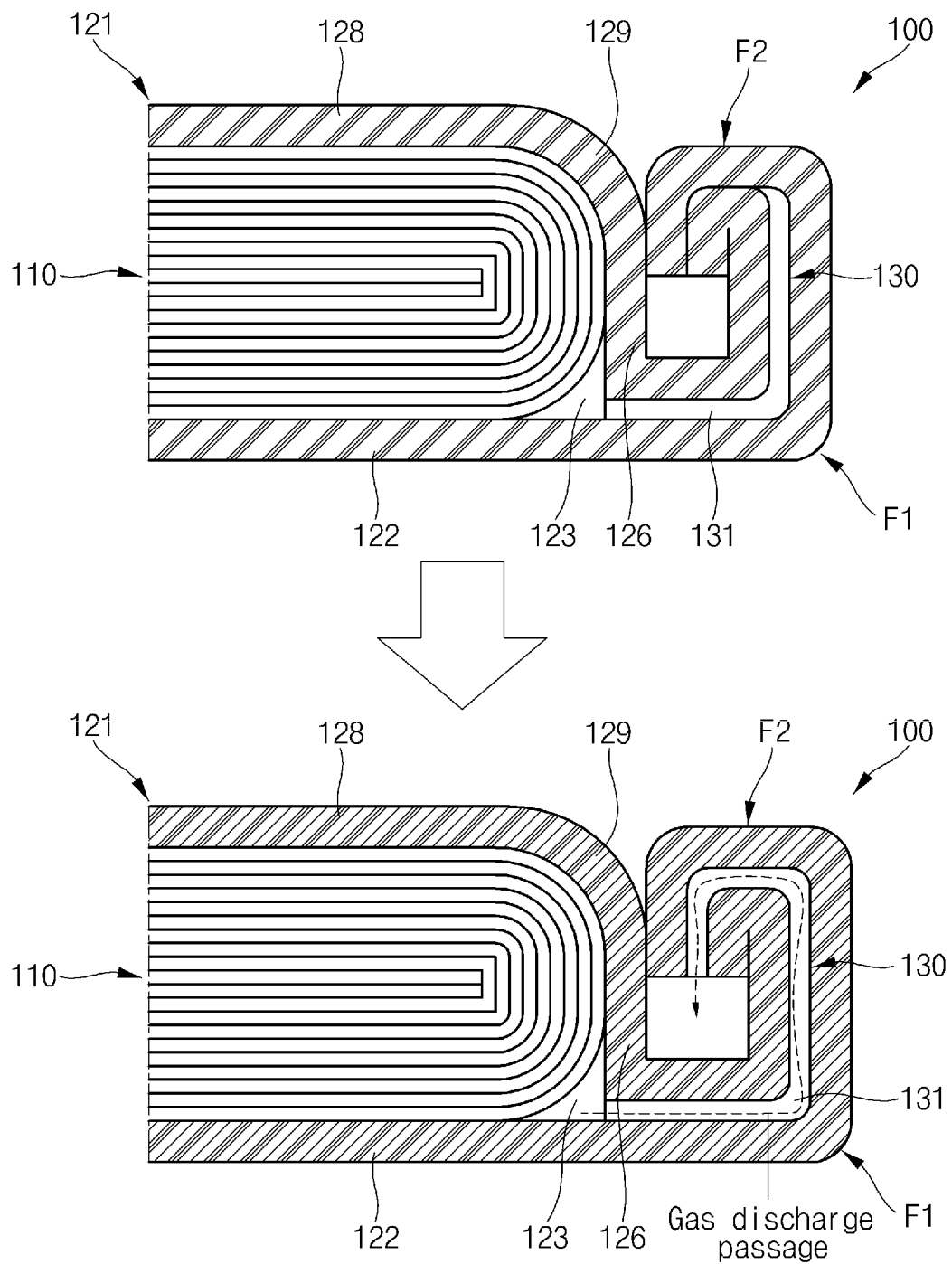
FIG. 10 is a plan view showing a gas discharge passage in the pouch-type secondary battery having an unsealed portion according to various embodiments of the present invention.

FIG. 10 is a plan view showing a gas discharge passage in the pouch-type secondary battery 100 having an unsealed portion 130 according to various embodiments of the present invention is illustrated.

As illustrated in FIG. 10, the secondary battery 100 may have gas internally generated due to overcharging, heat exposure, etc. and the pouch 120 may be swelled by the generated gas. Thus, if the internal pressure exceeds a reference pressure, a lengthwise seal portion 124 corresponding to the unsealed portion 130 may be ruptured (opened) and the gas may be quickly discharged out of the battery. Here, even if a primary folded portion F1 and a secondly folded portion F2 are located at the unsealed portion 130 and the lengthwise seal portions 124, the lengthwise seal portions 124 produced after the secondly folded portion F2 may be easily ruptured/opened by the internal pressure of the pouch 120.

Although the foregoing embodiments have been described to practice the secondary battery of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

The invention claimed is:

1. A pouch-type secondary battery comprising:
an electrode assembly; and
a pouch comprising a first sheathing portion having a recess in which the electrode assembly is received and a second sheathing portion covering the recess of the first sheathing portion,
wherein the recess has a first depth,
wherein a seal portion is formed along peripheries of the first and the second sheathing portions, and
wherein a portion of the peripheries of the first and second sheathing portions is an unsealed portion, the unsealed portion being in fluid communication with the recess and having a second depth that is less than the first depth.

2. The pouch-type secondary battery of claim 1, wherein the unsealed portion is provided by allowing the first sheathing portion and the second sheathing portion of the pouch to be spaced apart from each other.

3. The pouch-type secondary battery of claim 1, wherein the unsealed portion is provided by allowing the first sheathing portion and the second sheathing portion of the pouch not to be adhered to each other.

4. The pouch-type secondary battery of claim 1, wherein the unsealed portion is located at the first sheathing portion or the second sheathing portion of the pouch.

5. The pouch-type secondary battery of claim 1, wherein the unsealed portion is located at both of the first sheathing portion and the second sheathing portion of the pouch.

6. The pouch-type secondary battery of claim 1, wherein the unsealed portion has a curved or angled cross-section.

7. The pouch-type secondary battery of claim 1, wherein the seal portion of the pouch includes a primary folded portion that is primarily folded in a direction parallel with a length direction of the electrode assembly, and a secondly folded portion that is secondly folded toward the electrode assembly in a direction parallel to the primary folded portion, and the unsealed portion ranges from the recess to the secondly folded portion.

8. The pouch-type secondary battery of claim 1, wherein the seal portion of the pouch includes a pair of lengthwise seal portions that are parallel to a length direction of the electrode assembly, and a widthwise seal portion that is parallel to a width direction of the electrode assembly, and the unsealed portion is located at the lengthwise seal portions.

9. The pouch-type secondary battery of claim 1, wherein the seal portion of the pouch includes a pair of lengthwise seal portions that are parallel to a length direction of the electrode assembly, and a widthwise seal portion that is parallel to a width direction of the electrode assembly, and the unsealed portion is located at the widthwise seal portion.

10. The pouch-type secondary battery of claim 1, wherein the seal portion of the pouch includes a pair of lengthwise seal portions that are parallel to a length direction of the electrode assembly, and a widthwise seal portion that is parallel to a width direction of the electrode assembly, and the unsealed portion is located at both of the lengthwise seal portions and the widthwise seal portion.

11. The pouch-type secondary battery of claim 1, wherein a plurality of unsealed portions are at the peripheries of the first and second sheathing portions, and
wherein ones of the unsealed portions are spaced apart from each other with the sealed portion therebetween.

12. The pouch-type secondary battery of claim 11, wherein the unsealed portions are spaced apart from each other a regular interval in a length direction of the electrode assembly.

13. The pouch-type secondary battery of claim 12, wherein the unsealed portions are at the peripheries of the first and second sheathing portions at both sides of the electrode assembly in a width direction of the electrode assembly.

14. The pouch-type secondary battery of claim 12, wherein an electrolyte is contained within the recess and the unsealed portion.

* * * * *